Figures 1, 2, 3:
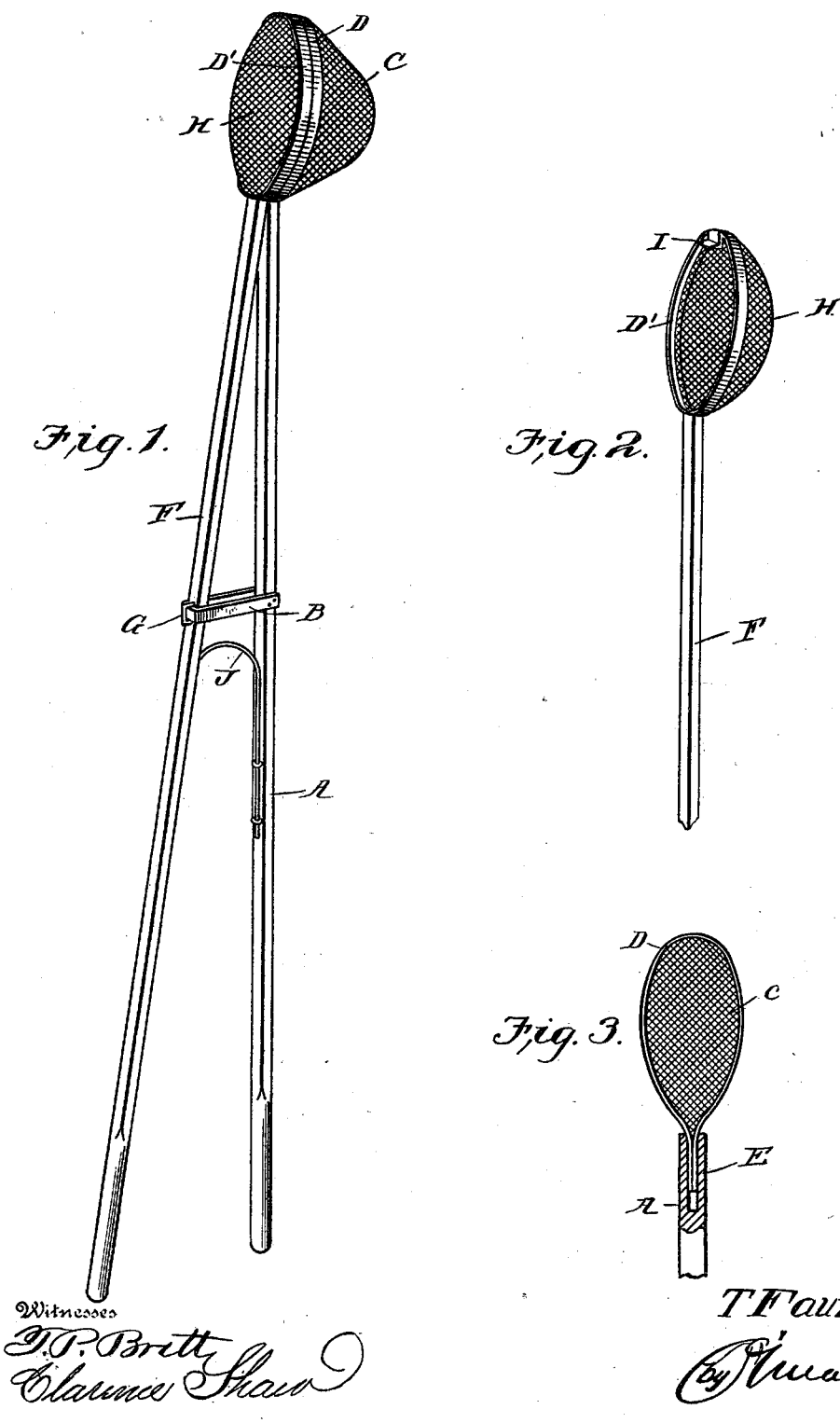

No. 670,953. Patented Apr. 2, 1901.
T. FAUREST.
FRUIT PICKER.
(Application filed Nov. 24, 1900.)
(No Model.)

Witnesses
Inventor
T. Faurest,
Attorneys

UNITED STATES PATENT OFFICE.

THEODORE FAUREST, OF CLEARLAKE, ARKANSAS.

FRUIT-PICKER.

SPECIFICATION forming part of Letters Patent No. 670,953, dated April 2, 1901.

Application filed November 24, 1900. Serial No. 37,656. (No model.)

*To all whom it may concern:*

Be it known that I, THEODORE FAUREST, a citizen of the United States, residing at Clearlake, in the county of Mississippi and State of Arkansas, have invented a new and useful Fruit-Picker, of which the following is a specification.

This invention relates to improvements in fruit-pickers; and the object is to provide an improved device for picking fruit combining simplicity of construction and convenience in operating.

With the above object in view the invention consists in the novel features of construction hereinafter fully described, particularly pointed out in the claims, and clearly illustrated by the accompanying drawings, in which—

Figure 1 is a perspective view of a fruit-picker embodying my invention; Fig. 2, a similar view of the movable jaw, showing the cutter carried thereby; and Fig. 3, a sectional view showing the manner of attaching the jaws to the handles.

Referring now more particularly to the accompanying drawings, A designates a handle, which may be of any desired length, having secured thereto intermediately of its ends a band B, which extends transversely thereof and projects therefrom. At its upper end said handle carries a relatively fixed jaw consisting of a cup C, of wire or other preferred material, having a band D secured about its edge, the ends of said band being approximated, as illustrated in Fig. 3, to form a shank or stem E, which is inserted in an opening formed in the upper end of said handle. The cup is retained on the end of said handle by said approximated ends of the band, which tend to separate, and hence wedge themselves in the opening in said handle. Said cup is formed elliptical and is deep enough to receive and retain the fruit when the latter has been severed from the tree.

F designates the movable handle of the device, which is extended through the band at the opposite end thereof from handle B and is pivotally retained therein by a staple G, having its legs firmly fixed in said handle and loosely spanning the end of the band. Handle F carries at its upper end a relatively movable jaw H, which is of the same outline as the jaw of handle A, but is much shallower than the same. This jaw or cup is retained in the upper end of handle F in the same manner as the relatively fixed jaw carried by handle A. The band D', however, of this jaw H is formed at the outer end of said jaw with a projecting portion I, which is sharpened to form a cutting edge.

J designates a U-shaped spring, having its legs secured, respectively, to the inner sides of handles A and F below the pivotal connection of handle F with band B, said spring normally holding the movable jaw or cup H in contact with the relatively fixed or stationary jaw or cup carried by handle A.

In operation to pluck the fruit from the tree the lower end of handle F is pressed inwardly toward handle A, which separates the movable jaw from the fixed jaw. The upper end of the device is then positioned with the stem of the fruit between the jaws and handle F released. Spring J then moves the jaw H toward the relatively fixed jaw, causing the cutter carried by said movable jaw to sever the fruit, which drops into the relatively fixed jaw or cup.

From the above description it will be seen that I have produced a very simple and conveniently-operated fruit-picker which may be readily operated to remove the fruit from the tree and which may be manufactured and sold at an exceedingly low price.

Having thus fully described my invention, what I claim as new, and desire to secure by Letters Patent of the United States, is—

1. In a fruit-picker, the combination of two handles pivoted together, cups having bands secured about their edges with the ends of the bands approximated and secured to said handles, the band at the upper end of one of said edges being extended and sharpened to form a cutter, and a spring disposed between the two handles below the pivotal point thereof, substantially as described.

2. In a fruit-picker, the combination of two handles, a band rigidly secured to one of said handles and loosely embracing the other handle, a staple carried by the last-mentioned handle and loosely spanning said band, jaws carried by the upper ends of said handles, a cutter carried by the jaw of the movable handle, and a spring secured to both of said handles and disposed between the same at a point below the band, substantially as described.

THEODORE FAUREST.

Witnesses:
J. M. LANDRUM,
ED. F. GREER.